(12) United States Patent
Kuroda (10) Patent No.: US 9,834,060 B2
(45) Date of Patent: Dec. 5, 2017

(54) BUSH FOR STABILIZER

(71) Applicant: NHK SPRING CO., LTD., Yokohama-shi, Kanagawa (JP)

(72) Inventor: Shigeru Kuroda, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/778,522

(22) PCT Filed: Apr. 11, 2014

(86) PCT No.: PCT/JP2014/060544
§ 371 (c)(1),
(2) Date: Sep. 18, 2015

(87) PCT Pub. No.: WO2014/171412
PCT Pub. Date: Oct. 23, 2014

(65) Prior Publication Data
US 2016/0176260 A1    Jun. 23, 2016

(30) Foreign Application Priority Data
Apr. 19, 2013  (JP) ................ 2013-088614

(51) Int. Cl.
*F16F 1/36* (2006.01)
*B60G 21/055* (2006.01)
(Continued)

(52) U.S. Cl.
CPC .......... *B60G 21/0551* (2013.01); *F16C 17/12* (2013.01); *F16F 1/16* (2013.01);
(Continued)

(58) Field of Classification Search
CPC ........ B60G 21/0551; B60G 2204/1222; B60G 2204/41043; B60G 2204/4307; F16F 1/16; F16F 1/373
See application file for complete search history.

(56) References Cited

U.S. PATENT DOCUMENTS 4,951,962 A * 8/1990 Tomida ................ B60G 21/051
280/124.108
5,290,018 A   3/1994 Watanabe et al.
(Continued)

FOREIGN PATENT DOCUMENTS

DE    1848035 U    3/1962
JP    S62-102044 U    6/1987
(Continued)

OTHER PUBLICATIONS

Jul. 15, 2014 International Search Report issued in International Application No. PCT/JP2014/060544.
(Continued)

*Primary Examiner* — Bradley King
(74) *Attorney, Agent, or Firm* — Oliff PLC (57) ABSTRACT

A bush for a stabilizer is configured so that surface pressure at an adhered surface of a hole of the bush is uniform in adhering the bush to a bar of the stabilizer, whereby necessary adhesive strength is obtained. A bush has a body part that includes a rectangular part with a rectangular shape and a curving part having a curved shape at an outer circumferential part thereof. The body part has a side surface part on which a protruding part is formed so as to protrude outwardly. When contained in a U-shaped part of a bracket shown in FIG. 3B, the rectangular part is arranged at a straight line part of the U-shaped part, the curving part is
(Continued)

arranged at a circular arc part of the U-shaped part, and the protruding part is pressed toward the body part by an inner surface of the U-shaped part.

6 Claims, 8 Drawing Sheets

(51) Int. Cl.
  *F16F 1/16* (2006.01)
  *F16F 1/373* (2006.01)
  *F16C 17/12* (2006.01)
(52) U.S. Cl.
  CPC ...... *F16F 1/373* (2013.01); *B60G 2204/1222* (2013.01); *B60G 2204/41* (2013.01); *B60G 2204/4104* (2013.01); *B60G 2204/41043* (2013.01); *B60G 2204/4307* (2013.01); *B60G 2206/73* (2013.01); *B60G 2206/821* (2013.01); *B60G 2206/91* (2013.01)

(56) References Cited

U.S. PATENT DOCUMENTS

| | | | | |
|---|---|---|---|---|
| 8,505,940 | B1* | 8/2013 | Hufnagle | B60G 21/0551 280/124.13 |
| 2007/0241526 | A1* | 10/2007 | Plante | B60G 21/0551 280/124.107 |
| 2008/0244861 | A1* | 10/2008 | Miyamoto | B60G 21/0551 16/2.1 |
| 2010/0176544 | A1* | 7/2010 | Miyamoto | B60G 3/14 267/189 |
| 2013/0270787 | A1 | 10/2013 | Suwa et al. | |
| 2015/0239319 | A1* | 8/2015 | Kuroda | B60G 21/055 267/141 |
| 2015/0290997 | A1* | 10/2015 | Imazu | B60G 21/0551 267/293 |

FOREIGN PATENT DOCUMENTS

| | | |
|---|---|---|
| JP | H09177853 A | 7/1997 |
| JP | 2001-270315 A | 10/2001 |
| JP | 2003-184821 A | 7/2003 |
| JP | 2006069233 A | 3/2006 |
| JP | 2012121414 A | 6/2012 |

OTHER PUBLICATIONS

Oct. 25, 2016 Search Report issued in European Patent Application No. 14785325.3.

* cited by examiner

BUSH FOR STABILIZER

TECHNICAL FIELD

The present invention relates to a bush for a stabilizer, which can be attached to a bar of a stabilizer for a vehicle, and in particular, relates to improvement of the shape of the bush for improving adhesive strength of the bush with respect to the bar.

BACKGROUND ART

Figure 1:
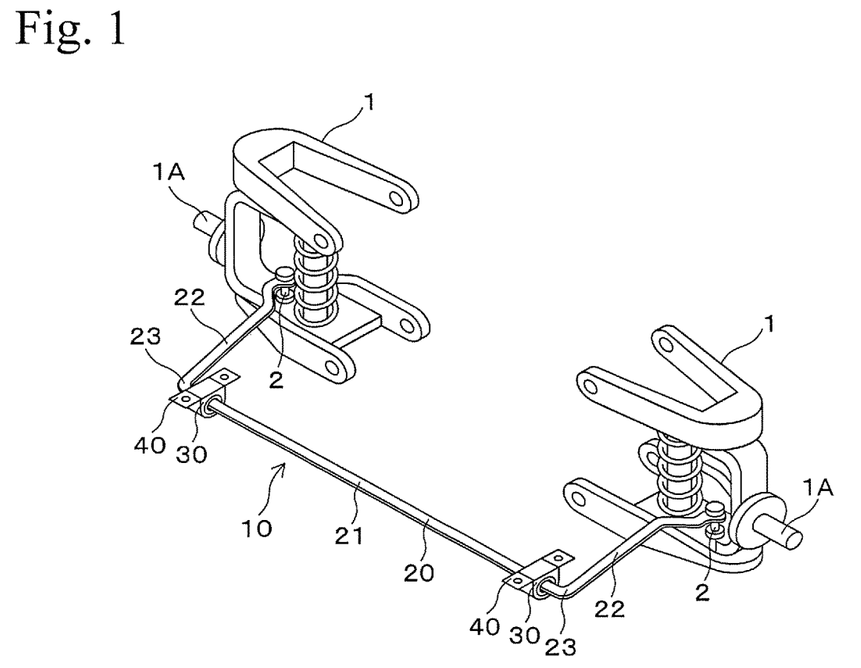
FIG. 1 is an oblique view showing a structure of a stabilizer connected to a suspension device of a vehicle.

A stabilizer, which is used for a vehicle such as an automobile, is a device for maintaining rigidity of the vehicle in a roll. FIG. 1 is a perspective view showing a construction of a stabilizer that is connected to a suspension device of a car. For example, the stabilizer 10 includes a bar 20 that includes a torsion part 21, an arm part 22, and a shoulder part 23, and which is formed in an approximately U-shape.

In the bar 20 of the stabilizer 10, the torsion part 21 is attached to a car body (not shown) via rubber bushes 30 (bush for stabilizer), and top portions of the arm part 22 are connected to suspension devices 1 via stabilizer links 2 (for example, see Japanese Unexamined Patent Application Publication No. 2001-270315). Each of the bushes 30 is fixed on the car body by a bracket 40. In such a stabilizer 10, attitude of the vehicle is stabilized by using a torsional reaction force of the bar 20. It should be noted that a tire (not shown) is attached to each of axle parts 1A located at the left and right of the suspension devices 1.

Figure 2:
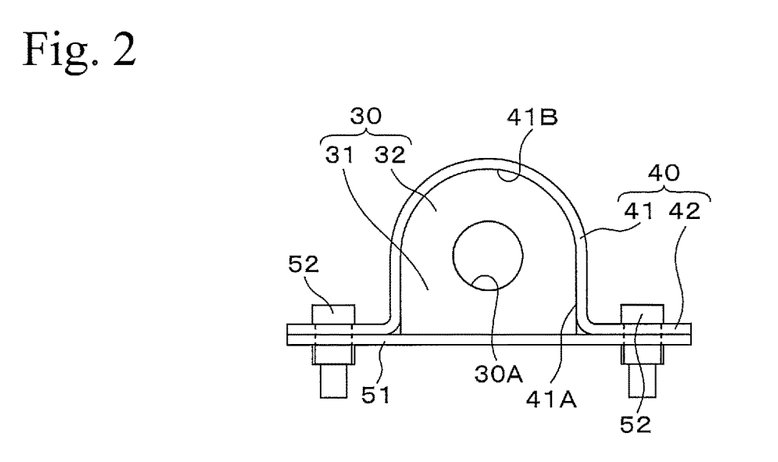
FIG. 2 is a cross sectional view showing a structure of a conventional bush for a stabilizer, to which a bracket is attached.

The bush 30 includes, for example, a rectangular part 31 of which the cross section of an outer circumferential part is linear and a sector part 32 of which the cross section of an outer circumferential part is a circular arc, as shown in FIG. 2. The bush 30 includes a hole 30A formed at the center thereof, in which the bar 20 of the stabilizer 10 can be inserted. The hole 30A is circular, for example. The bracket 40 includes, for example, a U-shaped part 41 (concave part) having a cross section in the U-shape, and flange parts 42 extending outwardly in the lateral direction from both ends of the U-shaped part 41, as shown in FIG. 2.

The U-shaped part 41 includes a straight line part 41A of which the cross section of an inner circumferential part is linear and a circular arc part 41B of which the cross section of an inner circumferential part is a circular arc. The U-shaped part 41 contains the bush 30. In this case, the straight line part 41A of the U-shaped part 41 covers the outer circumferential side surface part of the rectangular part 31, and the circular arc part 41B of the U-shaped part 41 covers the outer circumferential part of the sector part 32 of the bush 30. The flange parts 42 are fixed to a fixing member 51 of a vehicle side such as a plate, by fastening means 52 such as bolts, for example. In this case, the vehicle side fixing member 51 is arranged so as to contact a bottom of the rectangular part 31 exposed from the opening of the U-shaped part 41.

As the bush 30, a sliding bush is ordinarily used, which can move relatively along the axial direction of the torsion part of the bar. However, since the sliding bush moves relative to the torsion part of the bar, it may interfere with a part other than the torsion part. In addition, mud and water may penetrate into a gap between the sliding bush and the torsion part of the bar. Therefore, noise may be generated. Furthermore, since the relative positional relationship of the sliding bush and the torsion part may be misaligned, performance of the stabilizer for vehicles cannot be maintained, and therefore, driving stability, ride quality, and like, may be adversely affected. Then, in order to solve the above problems, it has been suggested that the bush be fixed to the torsion part by an adhesive.

However, in the shape of the bush 30 shown in FIG. 2, the volume of the bush 30 is uneven along the circumferential direction of the torsion part 21 that is inserted into the hole 30A. Therefore, during the attaching of the bush 30 to the vehicle side fixing member 51 via the bracket 40, surface pressure of the adhered surface (inner circumferential surface) of the hole 30A of the bush 30 to the outer circumferential surface of the bar 20 may be uneven. As a result, adhesive force is insufficient at a part at which a low surface pressure is applied to the adhered surface of the hole 30A of the bush 30, and necessary adhesive strength may not be obtained.

DISCLOSURE OF THE INVENTION

Accordingly, an object of the present invention is to provide a bush for a stabilizer, which is configured so that surface pressure at an adhered surface of a hole of the bush is uniform in adhering the bush to a bar of the stabilizer, whereby necessary adhesive strength is obtained.

The inventor of the present invention researched the surface pressure at an adhered surface (inner circumferential surface) of the hole of the bush to the bar of the stabilizer as follows.

Conventionally, regarding the size relationship between the bush and the bracket, an interference is provided in a direction connecting the U-shaped part (concave part) of the bracket and the center of the hole (corresponding to the height direction (vertical direction) of a vehicle), in order to obtain surface pressure at the adhered surface of the hole of the bush. However, an interference is not provided in a direction perpendicular to the direction connecting the concave part of the bracket and the center of the hole (corresponding to a horizontal direction (lateral direction) of a vehicle), in order to ensure assembling workability of the bush to the bracket.

Figure 3A:
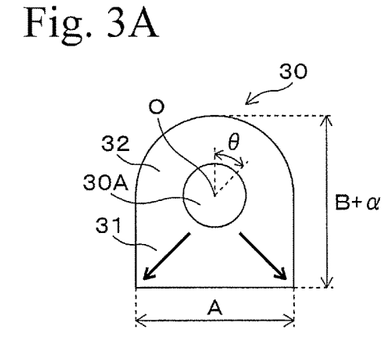
FIG. 3A is a cross sectional view showing a structure of a conventional bush for a stabilizer, in which an interference is provided in the height direction.
Figure 3B:
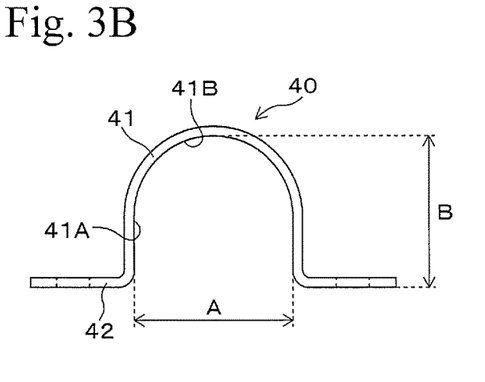
FIG. 3B is a cross sectional view showing a structure of a bracket.

For example, a bush 30 and a bracket 40 shown in FIGS. 3A and 3B may be used. In this case, regarding the vertical direction in the figures (corresponding to the vertical direction of a vehicle), the length of an opening of the U-shaped part 41 of the bracket 40 in the horizontal direction is set to be A, and the height from an upper end to a lower end of the inner circumferential surface of the U-shaped part 41 of the bracket 40 is set to be B. Then, the length of the bush 30 in the horizontal direction is set to be A, and the height of the bush 30 is set to be (B+α). Thus, an interference a is provided only in the vertical direction. It should be noted that the bush 30 has a shape that is, for example, bilaterally symmetric, and the circular shape of the hole 30A is concentrically with, for example, a circular shape including a sector part 32.

Figure 4:
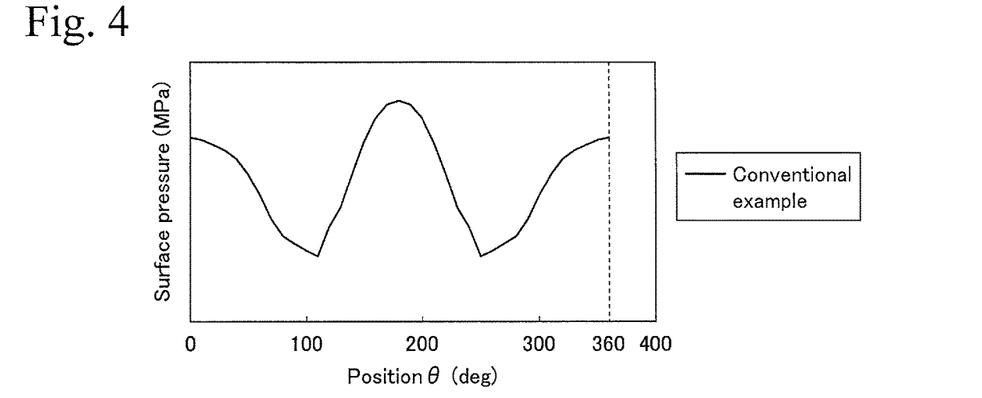
FIG. 4 is a graph showing a surface pressure distribution in the adhered surface (inner circumferential surface) of the hole of the bush for a stabilizer shown in FIG. 3A.

Results of research on the surface pressure at the adhered surface of the hole 30A of the bush 30 in the case of the above size relationship are shown in FIG. 4. It should be noted that an angle θ in FIG. 4 is an angle in the clockwise direction from the upper end position of the hole 30A as shown in FIG. 3A, and 0 degrees and 360 degrees indicate the upper end position of the hole 30A. For example, as is obvious from FIGS. 3A and 4, in the hole 30A, the surface pressure was at the maximum at portions where the angle θ is 0 degrees (upper end) and the angle θ is 180 degrees (lower end). On the other hand, the surface pressure was at the minimum at portions where the angle θ is approximately 100 to 110 degrees (oblique right lower part) and the angle θ is approximately 250 to 270 degrees (oblique left lower part). Consequently, a large surface pressure difference was generated. In the conventional example shown in FIG. 4 for example, the surface pressure difference was approximately 70%.

The reason for the occurrence of such a large surface pressure difference is considered to be as follows. That is, portions having large thickness with respect to the center of the hole 30A of the bush 30 (oblique right lower part and oblique left lower part) can flow to bent parts at boundaries between the U-shaped part 41 and the flange part 42 of the bracket 40 (in arrow directions shown in FIG. 3A).

It should be noted that the surface pressure difference is defined as follows: (surface pressure of maximum surface pressure part at adhered surface (maximum surface pressure)-surface pressure of minimum surface pressure part at adhered surface (minimum surface pressure))/(maximum surface pressure). In the present invention, the direction is defined based on, for example, as shown in FIG. 2, the case in which a concaved direction of a concave part of a bracket faces upper side. Then, a direction parallel to the concaved direction of the concave part is a height direction (vertical direction), and a direction perpendicular to the concaved direction is a horizontal direction (lateral direction). A cross section in the present invention is a cross section perpendicular to an axial direction of a hole of the bush.

The inventor of the present invention completed the present invention described below, in order to prevent the occurrence of a large surface pressure difference at an adhered surface of the hole of the bush, as shown in FIG. 4.

The present invention provides a bush for a stabilizer, configured to be contained in a concave part of a bracket. The bush includes a hole with a circular shape, which is configured so as to be adhered to a bar of the stabilizer, a body part with a side surface part, and a protruding part formed on the side surface part so as to protrude outwardly. The protruding part is pressed toward the body part by an inner surface of the concave part when the body part is contained in the concave part.

According to the bush for a stabilizer of the present invention, the protruding part formed on the side surface part of the body part outwardly protrudes and thereby increases the thickness of the side surface part of the bush. Therefore, the protruding part is pressed toward the body part by the inner surface of the concave part when the body part is contained in the concave part of the bracket.

In this case, the protruding part formed on the side surface part of the body part is positioned near portions corresponding to the oblique right lower part and the oblique left lower part, at which the surface pressure is the minimum, in the conventional example shown in FIG. 3A. Therefore, the surface pressure at the portions corresponding to the lower surface pressure parts of the hole of the conventional example is increased. The minimum value of the surface pressure is thus increased, whereby the surface pressure difference at the adhered surface of the hole of the bush can be set sufficiently low. In this case, for example, the surface pressure difference can be set to be not more than 50%. Accordingly, the surface pressure of the adhered surface of the hole of the bush is uniform in adhering the bush to a bar of a stabilizer, whereby necessary adhesive strength can be obtained.

Various kinds of structures can be employed in the bush for a stabilizer of the present invention. For example, an upper end of the protruding part can be positioned at the same height as, or at a greater height than, an upper end point of the inner circumferential surface of the hole, whereas a lower end of the protruding part can be positioned at the same height as, or at a lower height than, a lower end point of the inner circumferential surface of the hole.

In the above embodiment, the protruding part can be formed in a wide area on the side surface part of the body part. Therefore, the surface pressure at the portions corresponding to the lower surface pressure parts of the hole of the conventional example shown in FIG. 3A is increased without making the protruding part to have a large protruding amount relative to the inner surface of the concave part of the bracket. Thus, the protruding amount can be small, and ends of the protruding part are smoothly connected to the outer circumferential part of the body part. Accordingly, assembly of the bush to the bracket is easily performed.

The protruding part can have an outer circumferential shape without an inflection point. In this embodiment, the ends of the protruding part are more smoothly connected to the outer circumferential part of the body part, and the protruding part is shaped smoothly, whereby the assembly of the bush to the bracket is more easily performed.

The body part can have a rectangular part with a rectangular shape and a curving part having a curved shape at an outer circumferential part thereof. The curving part can be an elliptical arc part, and the ellipse including the elliptical arc part can have a short axis that is positioned in the height direction. In this case, the elliptical arc part is a part of, for example, an ellipse having an elliptical shape or an approximately elliptical shape. The rectangular shape includes the rectangular shapes and also includes approximately rectangular shapes.

In the above embodiment, the top of the curving part can be set at a low position, whereby the surface pressure at the portions corresponding to the top and the bottom, at which the surface pressure is the maximum, in the conventional example shown in FIG. 3A, is decreased. Therefore, the surface pressure difference at the adhered surface of the hole of the bush can be set sufficiently low, whereby the surface pressure at the adhered surface of the hole of the bush is uniform to a higher degree. In addition, the above effects are obtained without making the rectangular part at a lower position, and a center position of a bar of a stabilizer in the height direction is prevented from being dislocated from a design position when the stabilizer is mounted to a vehicle body. As a result, a layout for the vehicle is not greatly affected.

It should be noted that the above embodiment can be used separately from each embodiment of the bush for a stabilizer of the present invention. In this case, the bush for a stabilizer is configured to be contained in a concave part of a bracket and has a hole with a circular shape, to which a bar of the stabilizer is adhered, and a body part having a rectangular part with a rectangular shape and having a curving part with a curved shape at the outer circumferential part thereof. This curving part is an elliptical arc part, and an ellipse including the elliptical arc part has a short axis that is positioned in the height direction.

Effects of the Invention

According to the present invention, in the adhering of the bush to a bar of a stabilizer, the surface pressure of the inner circumferential surface of the hole of the bush is uniform, whereby necessary adhesive strength is obtained.

EXPLANATION OF REFERENCE SYMBOLS

Reference Symbols 100 and 200 denote a bush (bush for a stabilizer), 110 and 210 denote a body part, 101 and 201 denote a rectangular part, 102 denotes a curving part, 202 denotes a curving part (elliptical arc part), 103 and 203 denote a protruding part, α denotes an interference (interference in the height direction), L denotes a maximum protruding amount of one side in the horizontal direction, H denotes a reduced amount in the height direction, 10 denotes a stabilizer, 20 denotes a bar, 21 denotes a torsion part, 30A denotes a hole, 40 and 50 denote a bracket, 41 denotes a U-shaped part (concave part), 41A denotes a straight line part, 41B denotes a circular arc part, 42 denotes a flange part, 51 denotes a guiding part, and O denotes a center (center of the hole).

Best Mode for Carrying Out the Invention

A First Embodiment of the present invention will be described with reference to the figures hereinafter. The bush (bush for a stabilizer) of the First and the Second Embodiments is configured to be contained in the U-shaped part 41 (concave part) of the bracket 40 and be attached to the torsion part 21 of the stabilizer 10 instead of, for example, the bush 30 shown in FIGS. 1 to 3. The protruding part of the bush of the First and the Second Embodiments is a part, for example, which outwardly protrudes in the horizontal direction and has a length in the horizontal direction of the bush longer than the length A in the horizontal direction of the U-shaped part 41 of the bracket 40.

Figure 5:
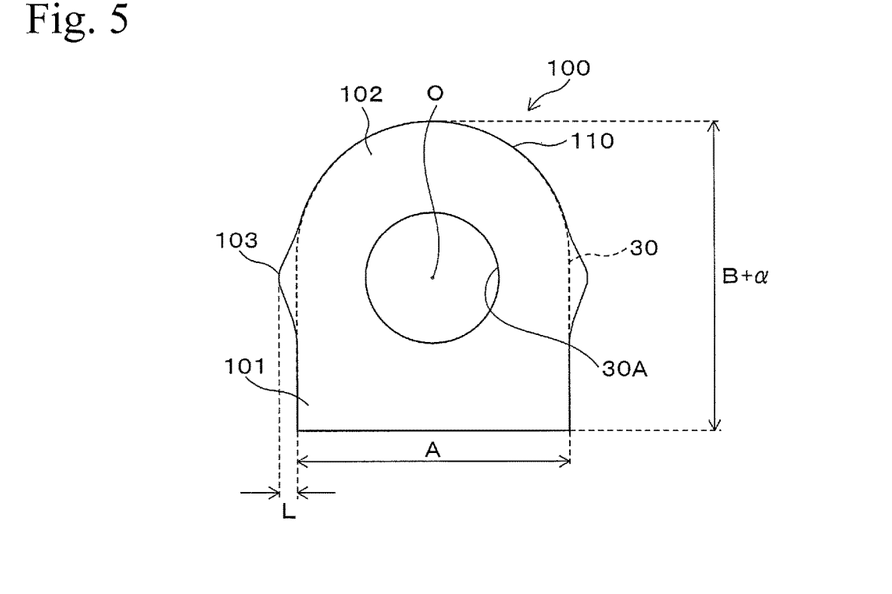
FIG. 5 is a cross sectional view showing a structure of a bush for a stabilizer in the First Embodiment according to the present invention.
Figure 6:
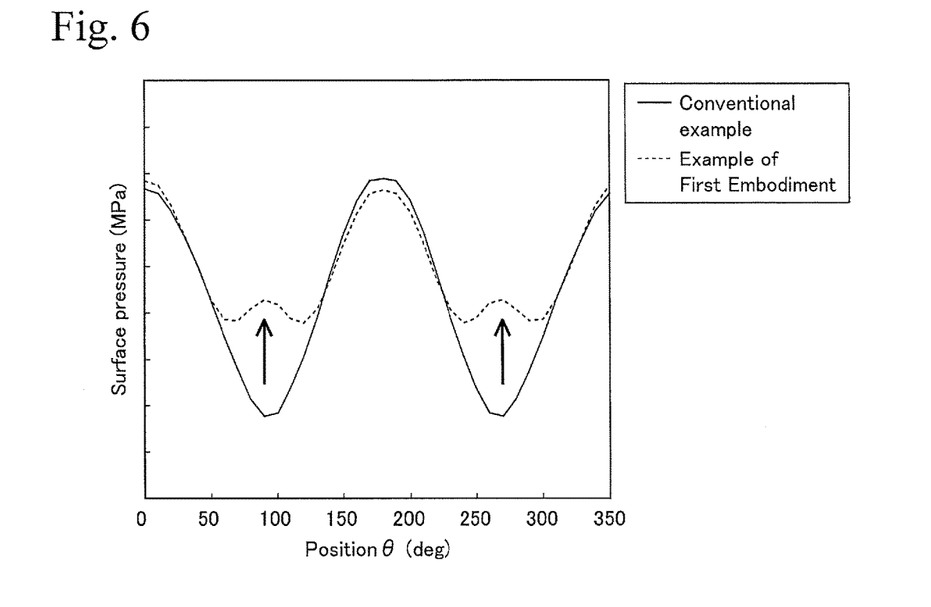
FIG. 6 is a graph showing a surface pressure distribution in the adhered surface (inner circumferential surface) of the hole of the bush for a stabilizer in the First Embodiment according to the present invention.
Figure 7:
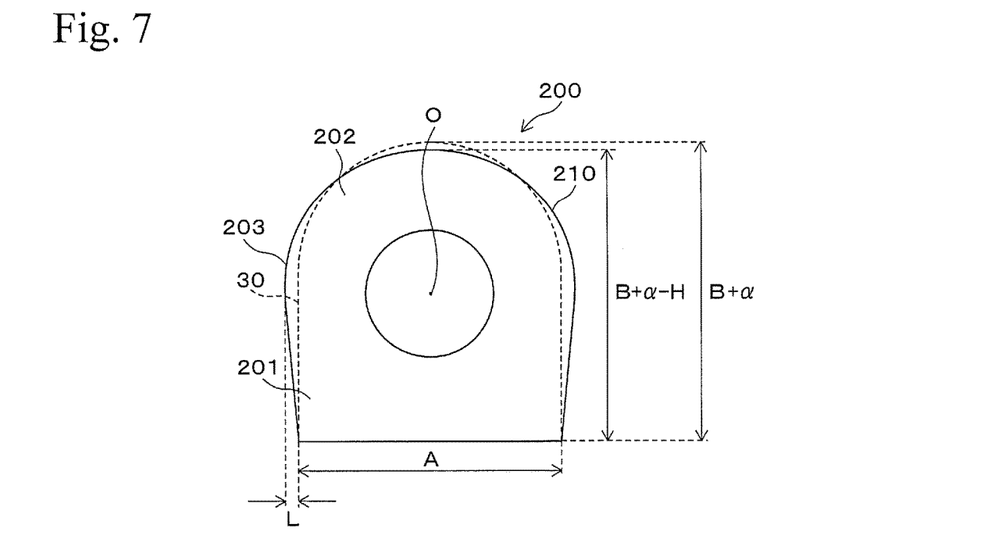
FIG. 7 is a cross sectional view showing a structure of a bush for a stabilizer in the Second Embodiment according to the present invention.

In the First and the Second Embodiments, the members and the parts having the same structures as those shown in FIGS. 1 to 3 are denoted by the same reference symbols, and descriptions thereof are omitted. The broken lines in FIGS. 5 and 7 show an outer circumferential shape of the bush 30. The angle θ in the graphs shown in FIGS. 6, 8, and 11 to 13 is, as in the case shown in FIG. 4, an angle in the clockwise direction from the upper end position of the hole in each embodiment, and 0 degrees and 360 degrees indicate the upper end position of the hole. It should be noted that an angle of not greater than 350 degrees is described in the graphs in FIGS. 6, 8, and 11 to 13. The surface pressure (surface pressure at each angle position at the adhered surface) and the surface pressure difference (surface pressure difference at the adhered surface) shown in FIGS. 6, 8 and 11 to 13 and Tables 1 to 3 are data obtained in a condition in which a bush with a hole inserted with a bar is contained in a bracket.

(1) First Embodiment

FIG. 5 is a cross sectional view showing a structure of a bush in the First Embodiment according to the present invention. The bush 100 of the First Embodiment has the same structure as the bush 30 of the conventional example shown in FIG. 3A except for the shape and the thickness of the outer circumferential part. Specifically, the bush 100 is made of an elastic material, for example, rubber, and has a hole 30A with a circular shape (for example, a true circular shape) and the same height (B+α) as the bush 30 shown in FIG. 3A.

Specifically, the bush 100 has a rectangular part 101 with a rectangular shape and a curving part 102 having a cross section of the outer circumferential part with a curved shape. The rectangular part 101 and the curving part 102 form the body part 110 of the bush 100. The body part 110 has a side surface part on which a protruding part 103 is integrally formed so as to outwardly protrude. The rectangular part 101 has an outer circumferential part that has a linear shape, for example, extending in a direction parallel to the height direction, except for the portion formed with the protruding part 103. The curving part 102 has an outer circumferential part that is a circular arc part, for example, with a circular arc shape, except for the portion formed with the protruding part 103.

The protruding part 103 outwardly protrudes and has a greater thickness of the side surface part of the bush compared with that of the bush 30 of the conventional example. The protruding amount of the protruding part 103 in the horizontal direction is set to be the maximum at a position at a height between an upper end point and a lower end point of the inner circumferential surface of the hole 30A in the vertical direction, for example, at the same height as the position of the center O of the hole 30A in the case shown in FIG. 5. The protruding amount of the protruding part 103 in the horizontal direction gradually decreases along the vertical direction away from the position with the maximum protruding amount as a center.

The protruding part 103 is formed in an area in the height direction, for example, within an area in the height direction in which the hole 30A is formed. That is, the upper end of the protruding part 203 is positioned, for example, at the same height as, or at a lower height than, an upper end point of the inner circumferential surface of the hole 30A, whereas the lower end of the protruding part 203 is positioned, for example, at the same height as, or at a greater height than, a lower end point of the inner circumferential surface of the hole 30A. The upper end of the protruding part 103 is smoothly connected to the outer circumferential part of the curving part 102, and the lower end of the protruding part 103 is smoothly connected to the outer circumferential part of the rectangular part 101. It should be noted that the symbol "L" in FIG. 5 represents the maximum protruding amount of one side of the protruding part 103 in the horizontal direction.

A process of adhering a bar 20 of the stabilizer 10 to the hole 30A will be described. First, for example, a target portion to be adhered with the bush 100 of the torsion part 21 of the bar 20 is coated with an adhesive. Then, for example, the bar 20 is inserted into the hole 30A of the bush 100, and the bush 100 is positioned at the target portion of the torsion part 21.

Next, the bush 100 with the hole 30A adhered with the torsion part 21 is contained in the U-shaped part 41 of the bracket 40. In this case, the straight line part 41A of the U-shaped part 41 covers the outer circumferential side surface part of the rectangular part 101 of the body part 110, and the circular arc part 41B of the U-shaped part 41 covers the outer circumferential part of the curving part 102 of the body part 110. In this case, when the bush 100 is contained in the U-shaped part 41 of the bracket 40, the outer circumferential part of the body part 110 closely adheres to the inner surface of the U-shaped part 41. At that time, the protruding part 103 is pressed toward the body part 110 of the bush 100 by the side surface part of the inner surface of the U-shaped part 41, and the wall thereof conforms, whereby the outer circumferential part of the bush 100 becomes a shape corresponding to the inner surface shape of the U-shaped part 41.

Then, a plate (not shown) is provided so as to close the opening of the U-shaped part 41 of the bracket 40 and is fixed to the flange part 42 of the bracket 40. Next, for example, the bush 100 contained in the bracket 40 is disposed within an adhesive curing device, whereby the adhesive is cured. Thus, the torsion part 21 of the bar 20 is adhered to the inner circumferential surface of the hole 30A of the bush 100.

In the First Embodiment, the protruding part 103 formed on the side surface part of the body part 110 of the bush 100 outwardly protrudes, and the thickness of the side surface part of the bush is partially increased thereat. Therefore, the protruding part 103 is pressed toward the body part 110 by the inner surface of the U-shaped part 41.

In this case, the protruding part 103 formed on the side surface part of the body part 110 is positioned near portions corresponding to the oblique right lower part and the oblique left lower part, at which the surface pressure is the minimum, in the conventional example shown in FIG. 3A. Therefore, the surface pressure at the portions corresponding to the lower surface pressure parts of the hole of the conventional example can be increased. Specifically, as shown in FIG. 6, in the bush of the First Embodiment, the contact surface pressure value is greatly increased at the portions and the vicinity thereof, at which the surface pressure is greatly decreased in the conventional example, as indicated by the upward arrows.

Thus, in the First Embodiment, since the minimum value of the contact surface pressure is increased by the protruding part 103, the surface pressure difference can be set sufficiently low at the adhered surface of the hole 30A of the bush 100. In this case, for example, the surface pressure difference can be set to be not more than 50%. Accordingly, in the adhering of the bush 100 to the bar 20 of the stabilizer 10, the surface pressure at the adhered surface of the hole 100A of the bush 100 is uniform, whereby necessary adhesive strength is obtained.

(2) Second Embodiment

FIG. 7 is a cross sectional view showing a structure of a bush in the Second Embodiment according to the present invention. In the bush 200 of the Second Embodiment, compared with, for example, the bush 100 of the First Embodiment, the shape is made for reducing the protruding amount of the protruding part in the horizontal direction in order to facilitate assembly with the bracket, and the height of the top of the curving part is reduced so as to make uniform the surface pressure at the adhered surface of the hole of the bush. The bush 200 has the same structure as the bush 100 of the First Embodiment except for these changes.

The bush 200 has a rectangular part 201 with, for example, a rectangular shape, and a curving part 202 having a cross section of the outer circumferential part with a curved shape, and the rectangular part 201 and the curving part 202 form a body part 210 of the bush 200. The body part 210 has a side surface part on which a protruding part 203 is integrally formed so as to outwardly protrude.

The curving part 202 is preferably an elliptical arc part having, for example, an elliptical arc shape or an approximately elliptical arc shape. In this case, the ellipse including the curving part 202 of the elliptical arc part has a long axis, which is positioned, for example, in the horizontal direction, and has a short axis, which is positioned, for example, in the height direction. Thus, the top of the curving part 202 has a smaller thickness compared with that of the bush 30 of the conventional example. It should be noted that the symbol "H" in FIG. 7 represents the reduced amount of the top of the curving part 202 in the height direction.

The protruding part 203 outwardly protrudes and has a greater thickness of the side surface part of the bush compared with that of the bush 30 of the conventional example. The protruding amount of the protruding part 203 in the horizontal direction is set to be the maximum at a position at a height between the upper end point and the lower end point of the inner circumferential surface of the hole 30A in the vertical direction, for example, at the same height as the center O of the hole 30A in the example shown in FIG. 7. The cross section of the outer circumferential part of the protruding part 203 formed at the bottom side of the body part 210 has a tapered shape so that the length in the horizontal direction is decreased toward the bottom. It should be noted that the symbol "L" in FIG. 7 represents the maximum protruding amount of one side of the protruding part 203 in the horizontal direction.

The protruding amount of the protruding part 203 in the horizontal direction gradually decreases along the vertical direction away from the position with the maximum protruding amount as a center. The protruding part 203 is formed in an area in the height direction, preferably in an area in the height direction that is higher than the area in which the hole 30A is formed. That is, the upper end of the protruding part 203 is preferably positioned at the same height as, or at a greater height than, the upper end point of the inner circumferential surface of the hole 30A, whereas the lower end of the protruding part 203 is preferably positioned at the same height as, or at a lower height than, the lower end point of the inner circumferential surface of the hole 30A.

In the example shown in FIG. 7, the upper end of the protruding part 203 is positioned higher than the upper end point of the inner circumferential surface of the hole 30A and is smoothly connected to the outer circumferential part of the curving part 202. The lower end of the protruding part 203 is positioned at the bottom of the rectangular part 201. In this case, the protruding part 203 preferably has an outer circumferential shape without an inflection point (that is, without a concave part) as shown in FIG. 7.

Figure 8:
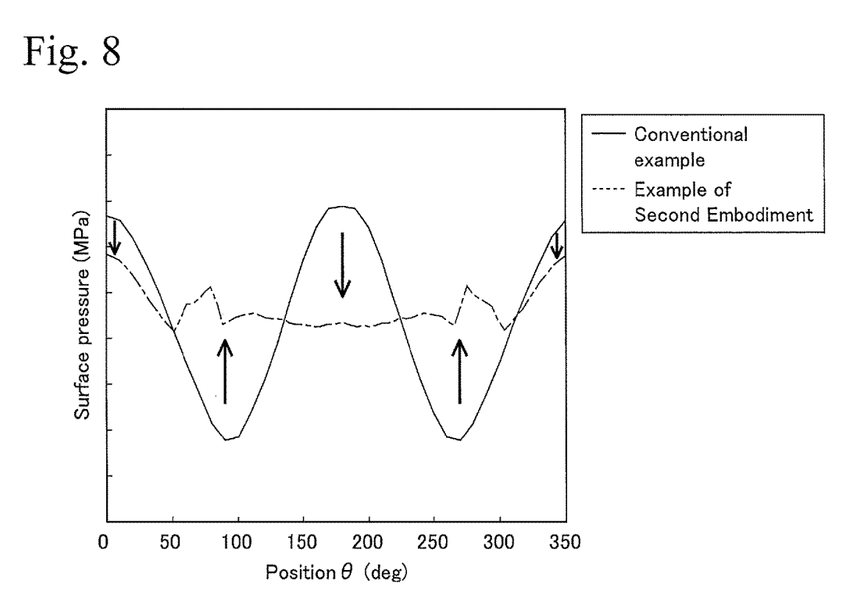
FIG. 8 is a graph showing a surface pressure distribution in the adhered surface (inner circumferential surface) of the hole of the bush for a stabilizer in the Second Embodiment according to the present invention.

In the Second Embodiment, the protruding part 203 can be formed in a wide area on the side surface part of the body part 210. Therefore, the surface pressure at the portions corresponding to the lower surface pressure parts of the hole of the conventional example shown in FIG. 3A can be increased without making the protruding part 203 have a large protruding amount relative to the inner surface of the U-shaped part 41 of the bracket 40. Specifically, as shown in FIG. 8, in the bush of the example of the Second Embodiment, the contact surface pressure value is greatly increased at the portions and the vicinity thereof, at which the surface pressure is greatly decreased in the conventional example, as indicated by the upward arrows.

Thus, in the Second Embodiment, since the minimum value of the contact surface pressure is increased by the protruding part 203, the surface pressure difference can be set sufficiently low at the adhered surface of the hole 30A of the bush 200. As a result, as in the case of the First Embodiment, the surface pressure at the adhered surface of the hole 100A of the bush 200 is uniform, whereby necessary adhesive strength is obtained.

Moreover, in this case, the protruding amount can be set to be small, and the upper end of the protruding part 203 is more smoothly connected to the outer circumferential part of the curving part 202, whereas the lower end of the protruding part 203 is more smoothly connected to the outer circumferential part of the rectangular part 201. Therefore, assembly of the bush 200 to the bracket 40 is easily performed. In addition, since the protruding part 203 has the outer circumferential shape without an inflection point, the upper end of the protruding part 203 is more smoothly connected to the outer circumferential part of the curving part 202, and the protruding part 203 is smoothly shaped. As a result, the assembly of the bush 200 with the bracket 40 is more easily performed.

The curving part 202 is an elliptical arc part, and the ellipse including the elliptical arc part has a short axis positioned in the height direction, whereby the top of the curving part 202 can be set at a low position. Therefore, the surface pressure at the portions corresponding to the top and the bottom, at which the surface pressure is the maximum, in the conventional example shown in FIG. 3A, is decreased. Accordingly, the surface pressure difference at the adhered surface of the hole 30A of the bush 200 can be set smaller. In this case, for example, the surface pressure difference can be set to be not more than 30%. Accordingly, the surface pressure at the adhered surface of the hole of the bush 200 can be uniform at a further high degree.

In addition, the above effects are obtained without making the rectangular part 201 at a lower position, a center position of the bar 20 of the stabilizer 10 in the height direction is prevented from being dislocated from a design position when the stabilizer 10 is mounted to a vehicle body. As a result, adverse effects on a layout for the vehicle are avoided.

(3) Modifications

Although explained by using the First and the Second Embodiments, the present invention is not limited thereto. Various structures can be employed in each member, structure and shape of each part, etc. in the above embodiments within the scope of the present invention.

Figure 9:
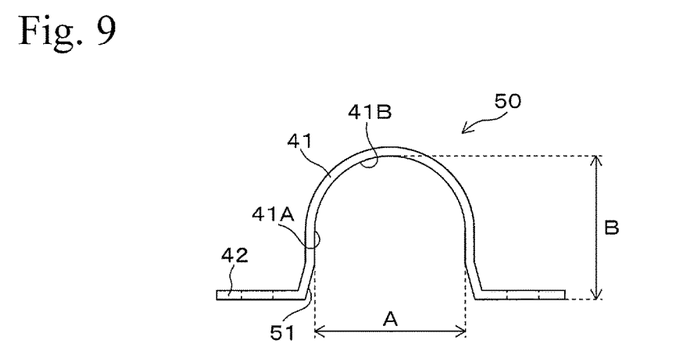
FIG. 9 is a cross sectional view showing a structure of a variation of a bracket for containing the bush for a stabilizer in the First Embodiment according to the present invention.

For example, in the First Embodiment, in order to make the assembly with the bracket 40 easier, a bracket 50 shown in FIG. 9 may be used instead of the bracket 40. The bracket 50 includes a U-shaped part 41 (concave part), a flange part 42, and a guiding part 51. The guiding part 51 is formed at a boundary part between the U-shaped part 41 and the flange part 42 and has a cross section of an inner circumferential part, which has a tapered shape so that the length in the horizontal direction is increased toward the opening side (lower side) of the U-shaped part 41. The shapes of the U-shaped part 41 and the flange part 42 are changed according to the size and the shape of the guiding part 51, compared with those in the First Embodiment.

In this embodiment, even when the protruding amount of the protruding part 103 in the horizontal direction is large, the bush 100 is smoothly inserted into the bracket 40 by the guiding part 51. In the bracket 50, in order to prevent concentration of the wall of the bush 100 at the guiding part 51 side when the bush 100 is contained, the shape of the guiding part 51 is desirably optimized in consideration of balance of: the tapered shape of the guiding part 51, formation of a clearance between the bush 100 and the guiding part 51 due to the tapered shape, the assembling workability of the bush 100, spring characteristics and torsion durability of the bush 100, etc. The bracket 50 may be used for containing the bush 200 of the Second Embodiment as necessary.

For example, in the Second Embodiment, the embodiment, in which the protruding amount of the protruding part 203 in the horizontal direction is made small, and the another embodiment, in which the thickness of the top of the curving part 202 is made small by using an elliptical arc part as the curving part 202, are used together, but these embodiments need not be used together and may be used separately. In addition, another embodiment, in which the thickness of the top of the curving part is made small, may be employed in the First Embodiment.

(4) Preferable Numerical Value Examples and Optimized Shape Examples of Embodiments Preferable numerical value examples (preferable numerical value examples of the protruding amount of the protruding part in the horizontal direction and the reduced amount of the curving part in the height direction) and optimized shape examples of the embodiments will be described.

Regarding the numerical value indicated in the present invention, the protruding amount of the protruding part in the horizontal direction is of one side (left side or right side) of the body part in the horizontal direction, and the protruding amount of the entirety of the bush in the horizontal direction is double the value of the protruding amount of the protruding part in the horizontal direction. A base thickness Tb is used for the protruding amount in the horizontal direction and the reduced amount of the curving part in the height direction. The base thickness Tb is the value obtained by the following First Formula, in which the length of the opening of the concave part of the bracket in the lateral direction is represented by A (FIG. 3B), and the diameter of the bar is represented by d. The First Formula can also be expressed by the Second Formula by using a curvature radius R (=A/2) of the circular arc part of the concave part of the bracket.

$$Tb=(A-d)/2 \quad \text{First Formula}$$

$$Tb=R-d/2 \quad \text{Second Formula}$$

(4A) Necessary Surface Pressure at Adhered Surface

In the adhering of the bar of the stabilizer to the hole of the bush, rubber strain, which occurs when the rubber of the bush is pressed against the bar of the adhering target, is necessary for obtaining the adhesive force from the point of view of the adhesive. Therefore, in order to evaluate whether the rubber reliably contacts the adhering target, a relationship between the rubber strain and the adhesive force was examined.

Figure 10:
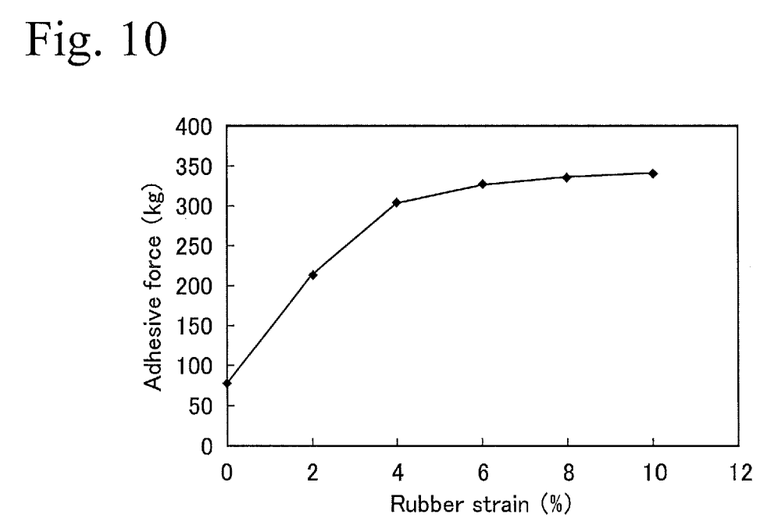
FIG. 10 is an example of a graph for explaining necessary surface pressure at the adhered surface (inner circumferential surface) of the hole of the bush of the practical example according to the present invention.

FIG. 10 is an example of a graph showing the relationship between the rubber strain and the adhesive force at the hole of the bush of a practical example according to the present invention. As is obvious from FIG. 10, although the adhesive force is increased with the increase in the rubber strain, the increasing rate becomes small when the rubber strain becomes great. As a result, the adhesive force is saturated when the rubber strain is 10%. In this case, if a fracture mode occurs when the rubber strain is 10%, the fracture occurs in the rubber based material, not in the adhering layer. Accordingly, by setting the contact surface pressure so that the rubber strain is not less than 10%, the adhesive force of the adhesive is sufficiently utilized.

(4B) Protruding Amount of Protruding Part in Horizontal Direction

By using the bush of the First Embodiment with the shape shown in FIG. 5, the relationship between the protruding amount of the protruding part in the horizontal direction and the contact surface pressure was examined by varying the protruding amount of the protruding part in the horizontal direction. The protruding amount in the horizontal direction is a distance in the horizontal direction between a maximum protruding position of the protruding part (for example, a maximum protruding position of the protruding part on the left side) of the bush and an end (for example, a left end) position of the bottom surface of the bush.

Figure 11:
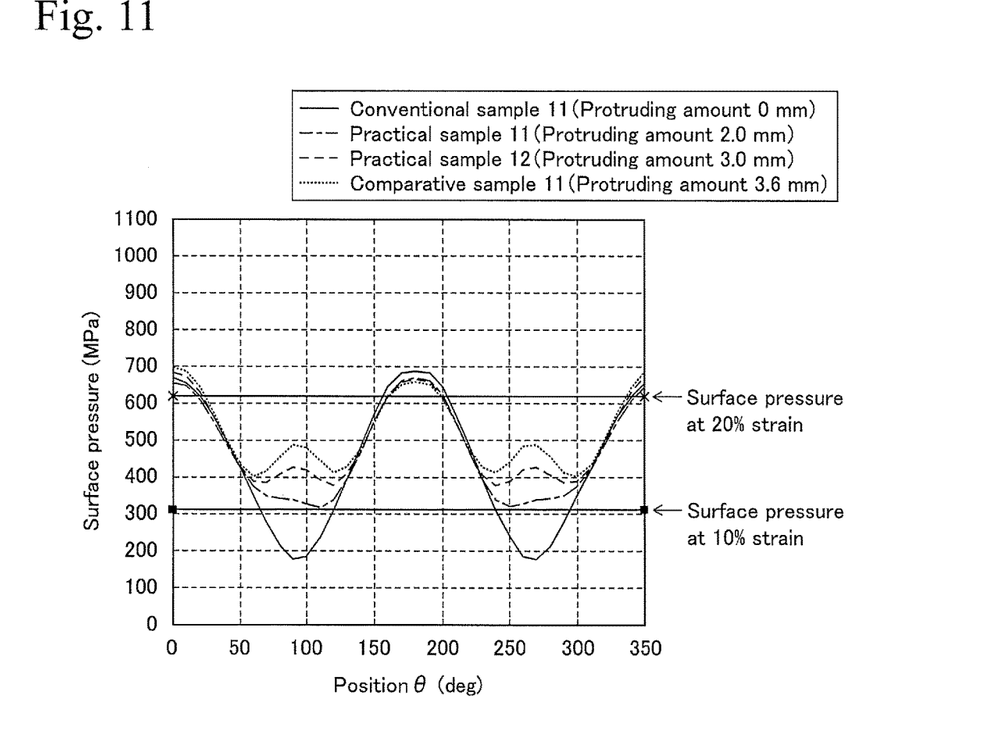
FIG. 11 is an example of a graph showing a surface pressure distribution in the adhered surface (inner circumferential surface) of the hole of the bush of the practical example in the First Embodiment according to the present invention, which shows a relationship between a protruding amount of the protruding part in the horizontal direction and the surface pressure distribution.

The protruding amount of one side was set to be 2.0 mm for a practical sample 11, 3.0 mm for a practical sample 12, 3.6 mm for a comparative sample 11, and 0 mm (no protruding part) for a conventional sample 11 with the shape shown in FIG. 3A. The results are shown in FIG. 11 and Table 1. In FIG. 11, the line formed between the plotted points ■ represents the contact surface pressure value when the rubber strain of the bush was 10%, and the line formed between the plotted points x represents the contact surface pressure value when the rubber strain of the bush was 20%.

TABLE 1

| Sample name (Protruding amount) | Maximum surface pressure MPa | Minimum surface pressure MPa | Contact surface pressure difference % |
|---|---|---|---|
| Conventional sample 11 (0 mm) | 688 | 178 | 74.1 |
| Practical sample 11 (2.0 mm) | 671 | 318 | 52.6 |
| Practical sample 12 (3.0 mm) | 683 | 379 | 44.5 |
| Comparative sample 11 (3.6 mm) | 698 | 401 | 42.6 |

As is obvious from FIG. 11 and Table 1, the surface pressure difference was greater than 70% in the conventional sample 11 in which the protruding amount of one side was 0 mm, but it was decreased with the increase in the protruding amount. In the practical sample 11 of the First Embodiment (the protruding amount of one side was 2.0 mm), it was confirmed that the surface pressure difference can be set at approximately 50%. In the practical sample 12 (the protruding amount of one side was 3.0 mm) of the First Embodiment and the comparative sample 11 (the protruding amount of one side was 3.6 mm), it was confirmed that the surface pressure difference can be set to be not more than 50%. In the practical samples 11 and 12 and the comparative sample 11, the surface pressure of not less than the surface pressure value when the rubber strain was 10% was obtained.

Accordingly, in order to obtain the necessary surface pressure (not less than the surface pressure value when the rubber strain is 10%) at the adhered surface and to set the surface pressure difference at approximately 50% or less, the lower limit of the protruding amount of one side is preferably set at 2.0 mm (16% of the base thickness Tb (that is, 0.16×Tb)). On the other hand, if the protruding amount of one side exceeds 3.0 mm, the assembling workability of the bush to the bracket is reduced. Therefore, the lower limit of the protruding amount of one side is preferably set at 3.0 mm (24% of the base thickness Tb (that is, 0.24×Tb)).

Thus, the preferable range of the protruding amount of the protruding part in the horizontal direction is 2.0 to 3.0 mm (0.16×Tb to 0.24×Tb).

(4C) Reduced Amount of Curving Part in Height Direction

The relationship between the reduced amount at the center portion of the curving part in the height direction and the contact surface pressure was examined by reducing the thickness of the center portion of the curving part in the height direction. A bush having a circular arc part as the curving part shown in FIG. 3A was used as a conventional sample 21, a bush having an elliptical arc part as the curving part was used as each of practical samples 21 to 23 in which the thickness of the center portion of the curving part in the height direction (thickness between the top point of the curving part and the upper end point of the hole) was reduced, respectively.

Figure 12:
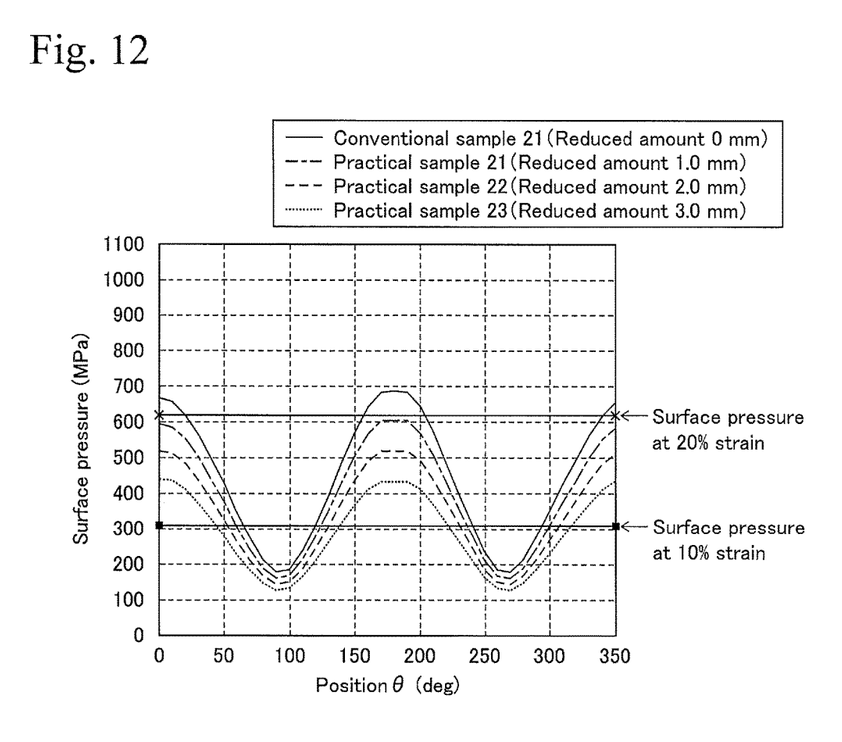
FIG. 12 is an example of a graph showing a surface pressure distribution in the adhered surface (inner circumferential surface) of the hole of the bush of the practical example according to the present invention, which shows a relationship between a reduced amount of the curving part in the height and the surface pressure distribution.

The reduced amount in the height direction was set to be 1.0 mm for the practical sample 21, 2.0 mm for the practical sample 22, and 3.0 mm for the practical sample 23. The reduced amount in the height direction is the difference in the thickness of the center portion of the curving part in the height direction between the conventional sample 21 having a circular arc part as the curving part and the practical sample having an elliptical arc part as the curving part. The results are shown in FIG. 12 and Table 2. In FIG. 12, the line formed between the plotted points ■ represents the contact surface pressure value when the rubber strain of the bush was 10%, and the line formed between the plotted points x represents the contact surface pressure value when the rubber strain of the bush was 20%.

TABLE 2

| Sample name (Reduced amount in height direction) | Maximum surface pressure MPa | Minimum surface pressure MPa | Contact surface pressure difference % |
|---|---|---|---|
| Conventional sample 21 (0 mm) | 688 | 178 | 74.1 |
| Practical sample 21 (1.0 mm) | 605 | 161 | 73.4 |
| Practical sample 22 (2.0 mm) | 520 | 145 | 72.2 |
| Practical sample 23 (3.0 mm) | 440 | 128 | 71.0 |

As is obvious from FIG. 12 and Table 2, the maximum surface pressure and the surface pressure difference were great in the conventional sample 21 having a circular arc part as the curving part. On the other hand, in the practical samples 21 to 23 in which an elliptical arc part was used as the curving part, by reducing the thickness of the center portion of the curving part in the height direction, the maximum surface pressure and the surface pressure difference were decreased with the increase in the reduced amount in the height direction. Moreover, in the practical samples 21 to 23, necessary surface pressure (not less than the surface pressure value when the rubber strain was 10%) at the adhered surface was obtained at the portions corresponding to high surface pressure portions in the conventional sample 21. In addition, the reduced amount of the maximum surface pressure was large, whereby the maximum surface pressure was decreased to not more than the surface pressure value when the rubber strain was 20%.

Accordingly, in order to set the maximum surface pressure at not more than the surface pressure value when the rubber strain is 20%, the lower limit of the reduced amount in the height direction is preferably set at 1.0 mm (8% of the base thickness Tb (that is, 0.08×Tb)). On the other hand, if the reduced amount in the height direction exceeds 3.0 mm, the goodness of fit of the bush to the bracket is reduced, whereby a space is formed between the bush and the bracket. Therefore, the upper limit of the reduced amount in the height direction is preferably set at 3.0 mm (24% of the base thickness Tb (that is, 0.24×Tb)).

Thus, the preferable range of the reduced amount of the curving part in the height direction is 1.0 to 3.0 mm (0.08×Tb to 0.24×Tb). In other words, regarding the reduced amount in the height direction, the preferable range thereof is 0.14×α to 0.42×α, in which a (FIG. 3A) is the interference in the vertical direction of the conventional sample 21 having a circular arc part as the curving part. In this case, the reduced amount in the height direction is preferably set at not less than 6% of the thickness in the height direction at the center portion of the curving part of the conventional sample 21 having a circular arc part as the curving part.

(4D) Optimized Shape Example

Figure 13:
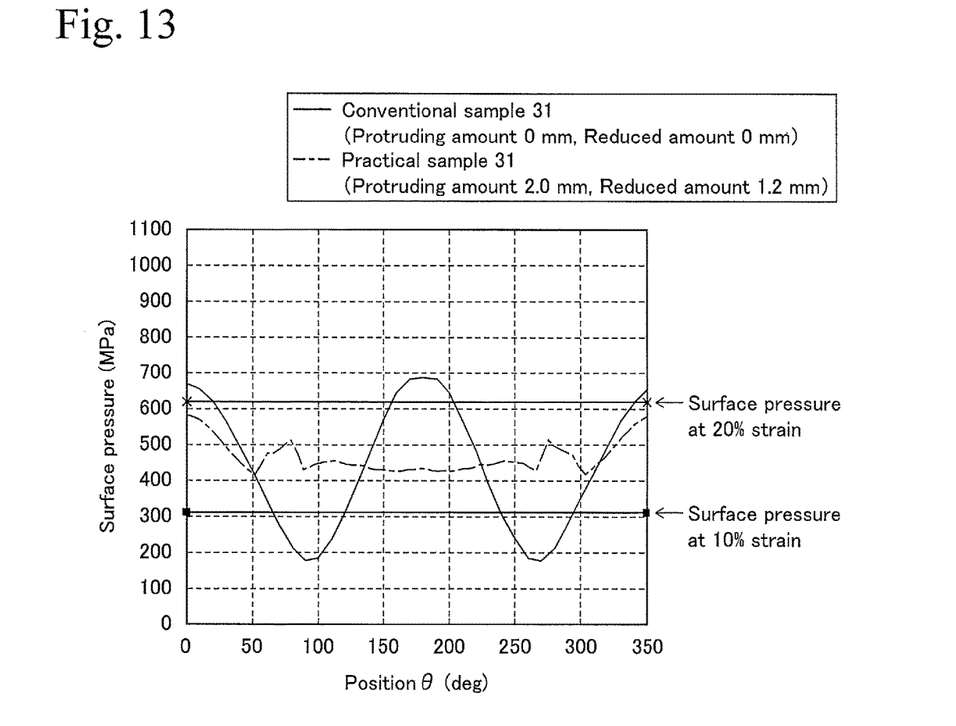
FIG. 13 is an example of a graph showing a surface pressure distribution in the adhered surface (inner circumferential surface) of the hole of the bush of the practical example in the Second Embodiment according to the present invention.

A practical sample 31 was prepared by using a bush of the Second Embodiment with the shape shown in FIG. 7 and by setting the protruding amount of one side of the protruding part at 2.0 mm and the reduced amount in the height direction at 1.2 mm, and a surface pressure distribution thereof was obtained. In addition, a conventional sample 31 was prepared by using a bush with the shape shown in FIG. 3A and by setting the protruding amount of one side at 0 mm (no protruding part) and the reduced amount in the height direction at 0 mm, and a surface pressure distribution thereof was obtained. The results are shown in FIG. 13 and Table 3. In FIG. 13, the line formed between the plotted points ■ represents the surface pressure value when the rubber strain of the bush was 10%, and the line formed between the plotted points x represents the surface pressure value when the rubber strain of the bush was 20%.

TABLE 3

| Sample name (Protruding amount, Reduced amount in height direction) | Maximum surface pressure MPa | Minimum surface pressure MPa | Contact surface pressure difference % |
|---|---|---|---|
| Conventional sample 11 (0 mm, 0 mm) | 688 | 178 | 74.1 |
| Practical sample 31 (3.0 mm, 1.2 mm) | 617 | 441 | 28.5 |

As is obvious from FIG. 13 and Table 3, in the practical sample 31 of the Second Embodiment, in which a protruding part was provided, and a top of a curving part was formed at a low position, the surface pressure at not less than the surface pressure value when the rubber strain was 10% was obtained, and it was confirmed that the surface pressure difference can be set to be not more than 30%.

Considering the results shown in FIGS. 11 to 13 and Tables 1 to 3 in total, in the bush of the Second Embodiment, the protruding amount of the protruding part in the horizontal direction is preferably in the range of 2.0 to 3.0 mm (0.16×Tb to 0.24×Tb), and the reduced amount of the curving part in the height direction is preferably in the range of 1.0 to 3.0 mm (0.08×Tb to 0.24×Tb). Thus, necessary surface pressure (not less than the surface pressure value when the rubber strain is 10%) at the adhered surface is obtained, the maximum surface pressure can be set to be not more than the surface pressure value when the rubber strain is 20%, and the surface pressure difference can be set to be not more than 30%.

The invention claimed is:
1. A bush for a stabilizer, which is configured to be contained in a concave part of a bracket, the bush comprising:
   a hole with a circular shape, which is configured to be adhered with a bar of the stabilizer;
   a body part with a side surface part; and
   a protruding part formed on the side surface part so as to outwardly protrude from a portion of the side surface part, wherein:
      the protruding part is pressed toward the body part by an inner surface of the concave part when the body part is contained in the concave part,
      the body part includes a rectangular part with a rectangular shape and a curving part having a curved shape at an outer circumferential part thereof, with the rectangular part side at a lower side and the curving part side at an upper side,
      a protruding amount of the protruding part in a horizontal direction gradually decreases in a vertical direction from a vertical center of the protruding part, which is where a maximum protruding amount of the protruding part in the horizontal direction is located, an upper end of the protruding part is positioned at the same height as, or at a lower height than, an upper end point of an inner circumferential surface of the hole, whereas a lower end of the protruding part is positioned at the same height as, or at a greater height than, a lower end point of the inner circumferential surface of the hole, and the upper end of the protruding part is smoothly connected to the outer circumferential part of the curving part, and the lower end of the protruding part is smoothly connected to the outer circumferential part of the rectangular part.

2. The bush for the stabilizer according to claim 1, wherein the curving part is an elliptical arc part, and an ellipse including the elliptical arc part has a short axis that is positioned in a height direction.

3. The bush for the stabilizer according to claim 1, wherein the protruding part is formed over an entire length of the hole in an axial direction thereof.

4. A bush for a stabilizer, which is configured to be contained in a concave part of a bracket, the bush comprising:

a hole with a circular shape, which is configured to be adhered with a bar of the stabilizer;

a body part with a side surface part; and a protruding part formed on the side surface part so as to outwardly protrude, wherein:

the protruding part is pressed toward the body part by an inner surface of the concave part when the body part is contained in the concave part, the body part includes a rectangular part with a rectangular shape and a curving part having a curved shape at an opposite side of the rectangular part and an outer circumferential part thereof, and the protruding part expands from the curving part and the rectangular part at a same axial position of the hole and is a smooth convex curve that touches the curving part and the rectangular part, and extends to a bottom part of the rectangular part when viewed from the axis direction.

5. The bush for the stabilizer according to claim 4, wherein the curving part is an elliptical arc part, and an ellipse including the elliptical arc part has a short axis that is positioned in a height direction.

6. The bush for the stabilizer according to claim 4, wherein the protruding part is formed over an entire length of the hole in an axial direction thereof.

* * * * *